Feb. 5, 1957 W. A. BEDFORD, JR 2,780,329
FASTENING DEVICE
Filed Dec. 30, 1952
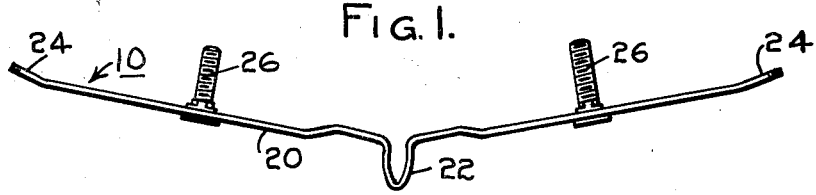
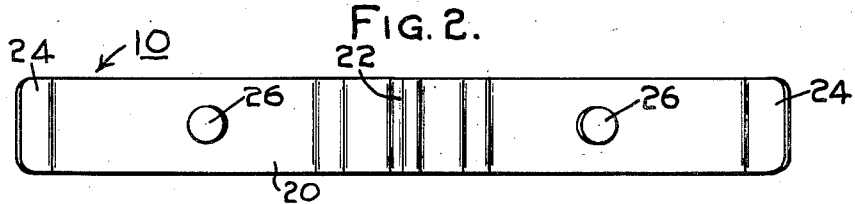
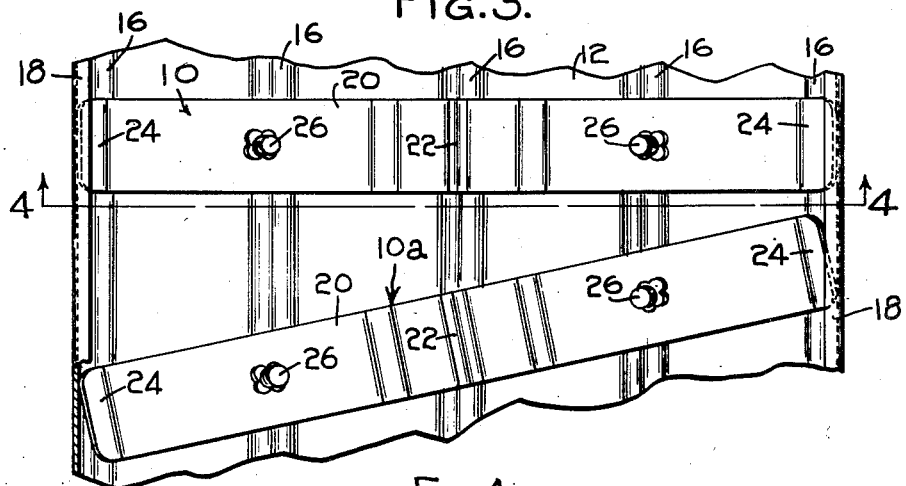
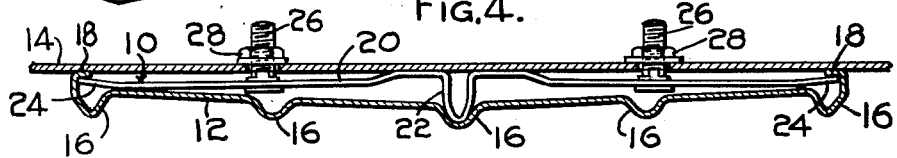
INVENTOR:
WILLIAM A. BEDFORD JR.,
BY Robert E Ross
ATTORNEY.

United States Patent Office 2,780,329
Patented Feb. 5, 1957

2,780,329
FASTENING DEVICE
William A. Bedford, Jr., North Scituate, Mass., assignor, by mesne assignments, to United-Carr Fastener Corporation, Boston, Mass., a corporation of Delaware
Application December 30, 1952, Serial No. 328,614
2 Claims. (Cl. 189—88)

This invention relates generally to fastening devices and has particular reference to a fastener for attaching a wide piece of trim molding to a support.

In the construction of automobile bodies, it is customary to attach trim molding to various portions of the body and for this purpose the molding is provided with inturned edges to receive a fastening device.

In certain types of molding, longitudinal grooves are provided for a distinctive appearance, and when the molding is relatively wide, that is, having a width greater than 3 or 4 inches, the center portion of the molding, if unsupported, tends to vibrate and rattle during operation of the automobile.

The object of the invention is to provide a molding fastener adapted to secure a relatively wide molding to a support.

A further object of the invention is to provide a fastener for a relatively wide molding which has means medially positioned thereon for supporting the center of the molding.

A still further object of the invention is to provide a fastener for a relatively wide molding which is adapted to retain the molding in a transversely flexed condition after assembly, with means therein supporting the medial portion of the molding.

Other objects of the invention will, in part, be obvious and will, in part, appear hereinafter.

In the drawing:

Fig. 1 is a view in side elevation of a molding fastener embodying the features of the invention;

Fig. 2 is a top plan view of the fastener of Fig. 1;

Fig. 3 is a plan view of a molding, illustrating the method of assembly therein of the fastener of Fig. 1;

Fig. 4 is a view in section taken on line 4—4 of Fig. 3.

Referring to the drawing, there is illustrated a molding fastener 10, which is adapted for attaching a molding 12 to a support 14.

The support 14 may be a portion of an automobile body or the like, and the molding 12 is relatively wide, with longitudinal embossments 16 to impart a distinctive appearance to the molding, and inturned edges 18 to enable the molding to receive the fastener 10 in a manner to appear hereinafter.

The fastener 10 comprises generally an elongated base 20 which is formed of a single piece of resilient sheet metal, and has a medial protruding U-shaped portion 22. The base 20 is generally bowed so that the ends 24 thereof are displaced away from the side of the medial portion having the protruding U-shaped portion, and to provide means for attachment to the support 14, bolts 26 are assembled into the base approximately midway between the U-shaped portion and the ends, so as to protrude from the base on the side opposite the U-shaped portion.

To assemble the fastener into the molding, the ends thereof are sprung so as to flatten the fastener, and the ends may then be placed under the inturned edges of the molding, and the fastener rotated so that it extends perpendicular to the longitudinal axis of the molding. In Fig. 3 the numeral 10a indicates the fastener in position to be assembled into the molding, and the other numbers with the subscript a indicate portions thereof corresponding to portions of the fastener 10 having corresponding numbers. Since the molding 12 is transversely flexible, by reason of its width and the presence of the longitudinal embossments 16, the resilience of the fastener 10 tends to flex the molding transversely, so that the ends 24 of the molding bear against the inturned edges, and the U-shaped projection 22 bears against the medial portion of the molding in a longitudinal embossment, thereby firmly retaining the fastener in position in the molding until it can be assembled onto the support.

Assembly onto the support is accomplished by simply inserting the bolts 26 into suitably spaced apertures therein, and assembling nuts 28 onto the bolts on the side of the support opposite the molding. When the nuts 28 are tightened against the support, the fastener is drawn against the support so that the ends 24 force the inturned edges of the molding against the support, with the medial portion of the molding still being supported by the U-shaped portion 22.

Although in the illustrated embodiment, only one medial projection is provided, it will be understood that with a wider molding, or with molding having various spacings between the longitudinal embossments, more than one projecting portion may be provided. The projecting portion may also have other shapes, so that it will conform to the concave side of longitudinal embossments of other shapes.

Since certain other obvious modifications may be made in the device without departing from the scope of the invention, it is intended that all matter contained herein be interpreted in an illustrative and not in a limiting sense.

I claim:

1. A fastening device for assembly into an elongated channel molding of abnormal width and having inturned end edges therein, comprising an elongated strip of flexible sheet metal, the medial portion thereof being transversely bent to form a U-shaped bearing portion projecting from the general plane of the strip for bearing against the center portion of the molding, said strip, when in unassembled relationship with said molding, being generally bowed longitudinally in a direction away from that of said U-shaped bearing portion, the free ends of said strip being inclined with respect to the general plane of said strip in a direction opposite to that of said bearing portion to engage the inturned end edges of said molding when in assembled relationship therewith, and a bolt assembled intermediate each end of said strip and the bearing portion and extending away from the general plane of said strip in a direction opposite to that of said bearing means for engagement in openings of a support panel.

2. A molding assembly for attachment to a support panel comprising an elongated, transversely flexible, sheet metal molding having inturned end edges therein, and a molding fastener assembled therewith, said molding fastener comprising an elongated strip of flexible sheet metal spanning the distance in a flexed state between the inturned end edges of said molding and having its ends flexed and retained thereunder, a medial U-shaped bearing portion projecting from the general plane of the strip in a direction toward the molding and bearing thereagainst, and a bolt assembled intermediate each end of the strip and the bearing portion, said bolts projecting in a direction away from the molding to enable the assembly to be attached to a support panel.

References Cited in the file of this patent
UNITED STATES PATENTS

| | | |
|---|---|---|
| 1,576,527 | McBride | Mar. 16, 1926 |
| 2,166,889 | Churchill | July 18, 1939 |
| 2,180,925 | Dyresen | Nov. 21, 1939 |
| 2,596,332 | Flora | May 13, 1952 |